(12) United States Patent
Farmer (10) Patent No.: US 6,213,720 B1
(45) Date of Patent: Apr. 10, 2001

(54) HIGH STRENGTH COMPOSITE REINFORCED TURBOMACHINERY DISK

(75) Inventor: James L. Farmer, Tempe, AZ (US)

(73) Assignee: AlliedSignal, Inc., Morris Township, NJ (US)

(*) Notice: Subject to any disclaimer, the term of this patent is extended or adjusted under 35 U.S.C. 154(b) by 0 days.

(21) Appl. No.: 09/330,708

(22) Filed: Jun. 11, 1999

(51) Int. Cl.[7] .................................................. B63H 1/26
(52) U.S. Cl. .................. 416/229 A; 416/230; 416/198 A
(58) Field of Search ........................ 416/198 R, 198 A, 416/229 R, 230, 229 A (56) References Cited

U.S. PATENT DOCUMENTS

| 3,515,501 | 6/1970 | Palfreyman et al. ............ 416/230 X |
| 3,554,667 | 1/1971 | Wagle ................................. 416/217 |
| 3,610,772 | 10/1971 | Wagle .............................. 416/198 R |
| 3,610,777 | 10/1971 | Wagle ............................ 416/198 A X |
| 3,625,634 | 12/1971 | Stedfeld ............................ 416/198 R |
| 3,758,232 | 9/1973 | Wallett . | |
| 3,765,796 | * 10/1973 | Stargardter et al. ............. 416/230 X |
| 3,787,141 | * 1/1974 | Walsh .............................. 416/230 X |
| 3,813,185 | 5/1974 | Bouiller et al. .................. 416/198 R |
| 3,966,523 | * 6/1976 | Jakobsen et al. ................ 416/230 X |
| 4,397,609 | * 8/1983 | Kochendorfer .................. 416/214 R |
| 5,632,600 | * 5/1997 | Hull ................................. 416/198 A |

* cited by examiner

Primary Examiner—John E. Ryznic
(74) Attorney, Agent, or Firm—Robert Desmond, Esq.

(57) ABSTRACT

A turbomachinery disk is provided that has a rim portion, an intermediate portion, and a hub portion. Annular flanges extend axially on both direction from the hub portion. Disposed concentrically about these flanges is a ring of reinforced composite fibers. The ring of composite fibers is of sufficient mass that some of the hoop stress in the hub portion will be transferred to the ring. As a result the mass of the disk is less than the mass of a conventional disk without the composite ring.

17 Claims, 6 Drawing Sheets

HIGH STRENGTH COMPOSITE REINFORCED TURBOMACHINERY DISK

TECHNICAL FIELD

The present invention relates generally to rotating wheels used in turbomachinery, and in particular, to high strength composite fiber reinforcement of turbomachinery wheels.

BACKGROUND OF THE INVENTION

In turbomachinery such as gas turbine engines, the blades used in the various fan, compressor, and turbine stages of the engine are mounted on the perimeter of metal disks also referred to as wheels. The metal disks are in turn mounted to a rotatable shaft supported on bearings.

During engine operation, the disks are subjected to high loads and high mechanical stress as a result of the centrifugal loading imparted to the disk at the high shaft rotational speeds typical of gas turbine engines. This centrifugal loading causes a radially outward pulling force to be applied, predominately by the blades and outer portion of the disk, to the inner portions of the disk known as the disk hub. As a result of this outward loading on the disk hub, the hub is stretched outward in the form of an expanding hoop, thereby creating substantial stress in hoop direction, better known as tangential stress. In fact, the tangential stress in the bore of the disk typically limits the useful life of the wheel.

To overcome this high hoop loading, and associated stress in the disk hub, the disk hubs are thickened in the axial direction to a point where the cross sectional area of the disk hub is sufficient to carry the hoop loading at an acceptable stress level. An undesirable effect of this disk hub thickening is that the weight of the wheel is substantially increased.

This increased weight results in other undesirable effects. Propulsion gas turbine engines are typically designed to be able to contain within the containment structure of the engine the loss of a blade, or the loss of a portion of the rim of a disk. However, because of the substantial mass of the thickened disk hub, it becomes impractical from a cost and weight perspective to add sufficient armor to be able to contain a ruptured disk. Another effect is that the shaft and the support structure in the engine supporting the shaft must be stronger, and consequently heavier, in order to support the disk with the thickened hub.

Accordingly, a need exists for a turbomachinery disk or wheel that can withstand the centrifugal loads due to high speed operation without requiring extra mass at the base of the wheel.

SUMMARY OF THE INVENTION

An object of the present invention is to provide a turbomachinery disk that can withstand the centrifugal loads due to high speed operation without requiring extra mass at the base of the wheel.

The present invention achieves this object by employing high strength fibers such as carbon or graphite or silicon carbide to reinforce the wheel or disk of a gas turbine engine. The disk is comprised a rim portion, an intermediate portion, and a hub portion having at least one axial extending annular flange. A ring of reinforced composite fibers is disposed concentrically about the flange. As a result some of the hoop stress in the hub portion is transferred to the composite ring. With less stress in the hub portion, the mass of the disk can be reduced when compared to the mass of a conventional disk without the composite ring.

BRIEF DESCRIPTION OF THE DRAWINGS

FIG. 4b is a perspective view of a fiber reinforcing ring used in the embodiment shown in FIG. 4a.

FIG. 6b is a cross-section of a view taken along line A—A of FIG. 6a.

DESCRIPTION OF THE PREFERRED EMBODIMENT

Figure 1:
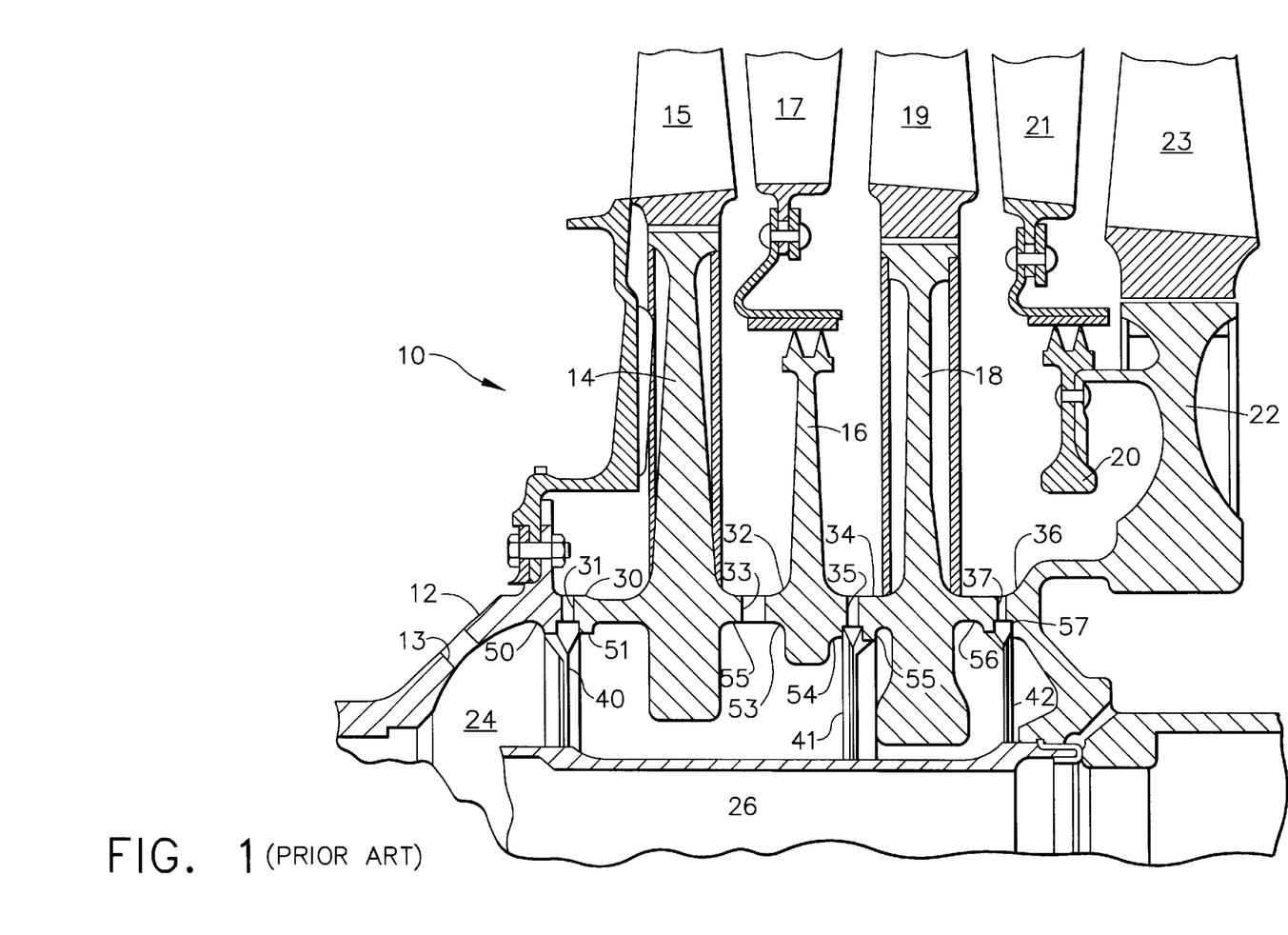
FIG. 1 is a cross-section of a prior art gas turbine engine turbine section.

Referring to the drawings, FIG. 1 shows a portion of a turbine section of a gas turbine engine generally denoted by reference numeral 10. Going from left to right in the axial direction, the turbine section is comprised of the following components. A turbine rotor disk shaft portion 12 having cooling air passage 13; a first turbine disk or wheel 14 having a rotor blade array 15 extending radially therefrom; a first rotating seal 16; a first array of stator vanes 17 disposed radially outward of said seal 16; a second turbine disk 18 having a rotor blade array 19 extending radially therefrom; a second rotating axial seal 20; a second array of stator vanes 21 disposed radially outward of said seal 20; and a third turbine a second turbine disk 18 having a rotor blade array 19 extending radially therefrom. Rotating components 12, 14, 16, 18 and 22 are annular and their inner surfaces define a bore 24 that extends axially through the center of the turbine section 10. A tie shaft 26 is disposed within the bore 24. Four interstage torque transmitting couplings 30, 32, 34, and 36 are disposed respectively between the shaft 12 and turbine disk 14, the turbine disk 14 and the seal 16, the seal 16 and the turbine disk 18 and the turbine disk 18 and the turbine disk 22. Each of these couplings 30, 32, 34, and 36 has a radial gap 31, 33, 35, and 37 respectively between meshing radial spline circumferentially mounted on opposing mating sections 50 and 51, 52 and 53, 54 and 55, and 56 and 57. Interstage coupling seals 40, 41, and 42 are mounted to the interior surface of the couplings 30, 34 and 36 respectively.

Figure 2:
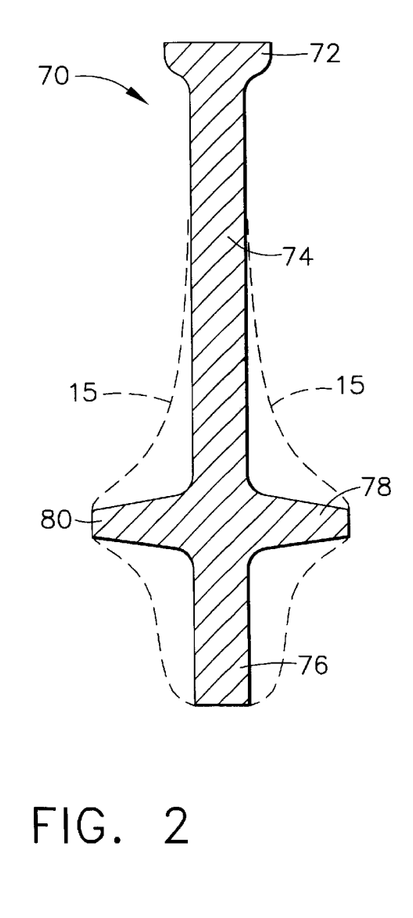
FIG. 2 is a cross-section of an exemplary turbine wheel having reduced axial thickness as contemplated by the present invention.

Referring to FIG. 2, the turbine wheel 14 is modified by removing the material represented by dashed lines 15 to form turbine wheel 70. The wheel 70 has a rim portion 72 an intermediate portion 74, and a hub portion 76. At the radially outer end of the hub portion 76, annular flanges 78 and 80 extend axially in both directions. The following descriptions of preferred and alternate embodiments are made with reference to either flange 78 or flange 80, it should be appreciated that the two flanges will mirror each other so that the description of one is applicable to the description of the other.

Figure 3A:
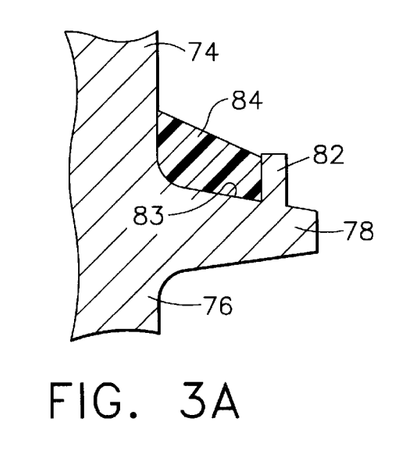
FIG. 3a is an enlarged cross-section of a portion encompassed by circle 3 of FIG. 2 showing the fiber reinforced wheel contemplated by the present invention.

Referring to FIG. 3a, in the preferred embodiment an annular dam 82 is integral with and extends radially outward from flange 78 to define spool-like surface 83. High strength composite fibers are wrapped onto the surface 83 in multiple successive coils while simultaneously applying the matrix material throughout. Conventional techniques for curing the composite are then employed. The completed composite is a thick composite ring 84 of unidirectional fibers aligned in the hoop direction. Preferably, the fibers are tightly wrapped onto the surface 83 so as to preload the wheel in compressive hoop loading. The composite is preferably shaped, thicker on its axial side adjacent the wheel 70 where the hoop loading applied to the composite will be greatest.

Figure 3B:
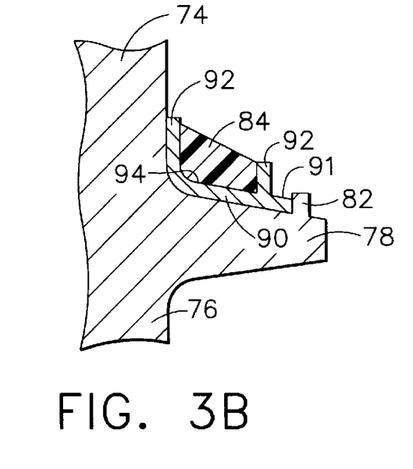
FIG. 3b is an enlarged cross-section of a portion encompassed by circle 3 of FIG. 2 showing an alternative embodiment of the fiber reinforcement contemplated by the present invention.

In an alternative embodiment, shown in FIG. 3b, an annular spool 90 is mounted on the flange 78. The spool 90 has a two radially extending lips 92 which axially bound a surface 94 for receiving the fibers. The composite may be wrapped onto the surface 94 and cured before the spool 90 is mounted to the flange 78. Thus, the inner surface of the spool 90 can be machined to form an interference fit with the outer surface of the flange 78. Conventional thermal differential techniques are then used to mount the spool 90 on flange 78, thereby again preloading the flange 78 in a compressive hoop direction. A spacer 91 which may be integral with the spool 90 or a separate structure, abuts the dam 82 to axially secure the spool 90.

Figure 4A:
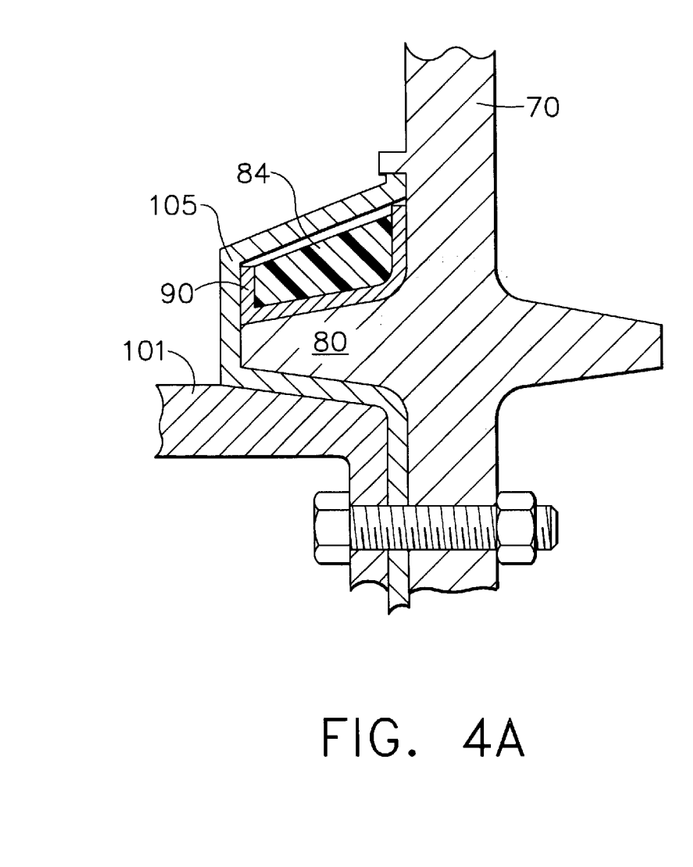
FIG. 4a is a cross-section of an alternative embodiment of the fiber reinforced wheel where the wheel is bolted to a shaft.
Figure 4B:
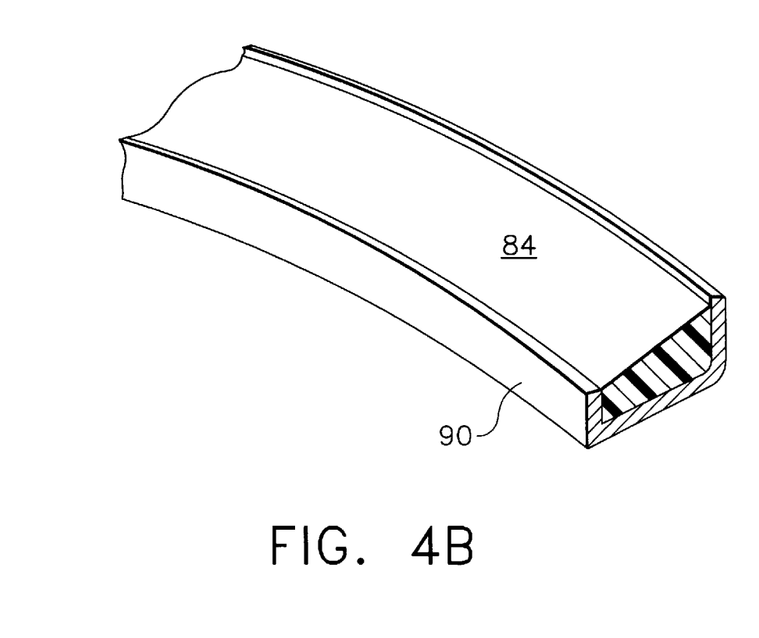

Another embodiment of the present invention is shown in FIGS. 4a and 4b. In this embodiment, the wheel 70 is configured to be bolted to a rotating shaft 101 at the hub portion of the wheel. The spool 90 having a composite fiber ring 84 is mounted on the flange 80. The spool 90 is axially secured by a cover plate 105. The cover plate 105 crosses over the top of the composite ring and is fitted between the shaft and hub portion where it is bolted thereto. This prevents the cover plate from lifting away from the composite ring under centrifugal loading. The cover plate acts as a heat shield, and may also be used to create a cooling cavity to facilitate passing cooling air over the composite ring.

Figure 5:
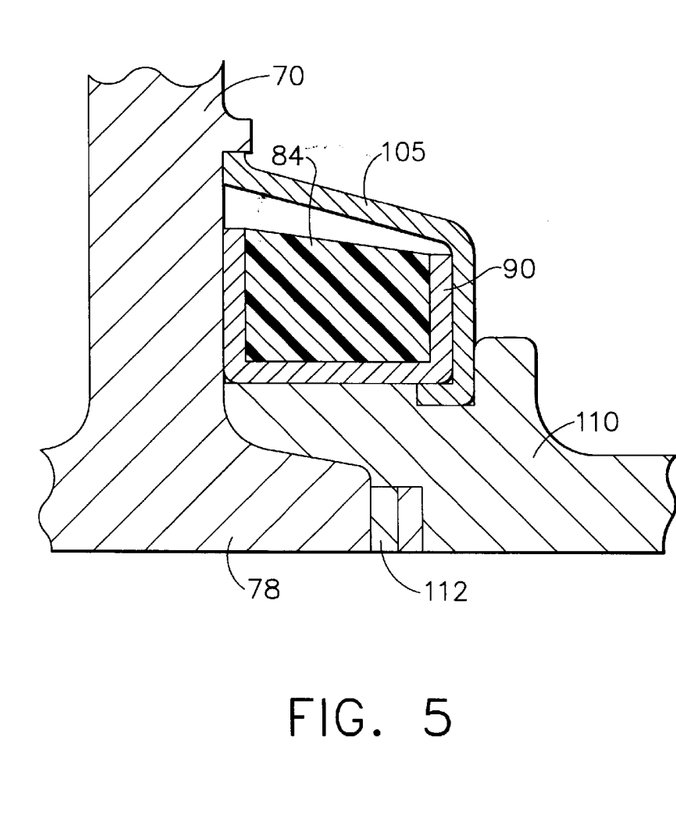
FIG. 5 is a cross-section of another alternative embodiment of the fiber reinforced wheel where the wheel is mounted to a mating shaft.
Figure 6A:
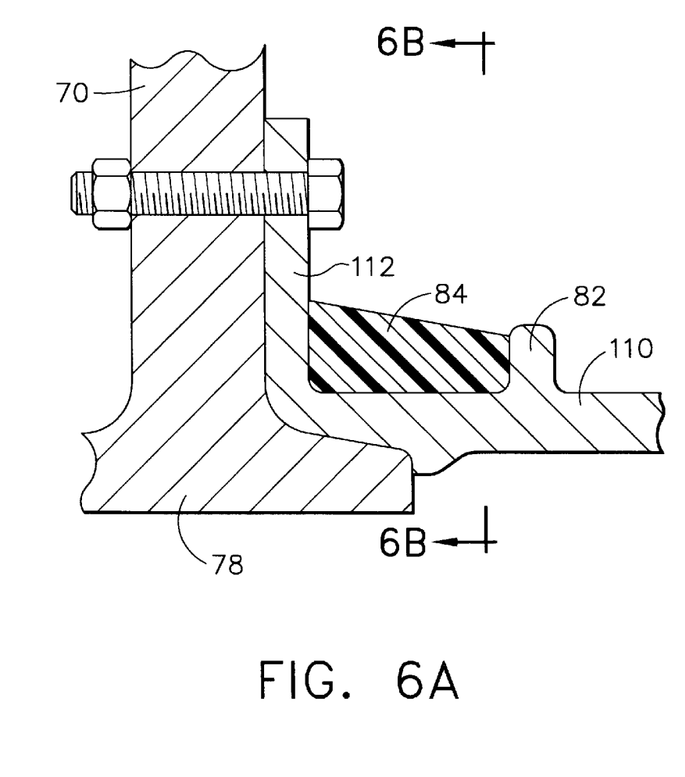
FIG. 6a is a cross-section of yet another embodiment of the fiber reinforced wheel where the wheel is bolted to a mating shaft.
Figure 6B:
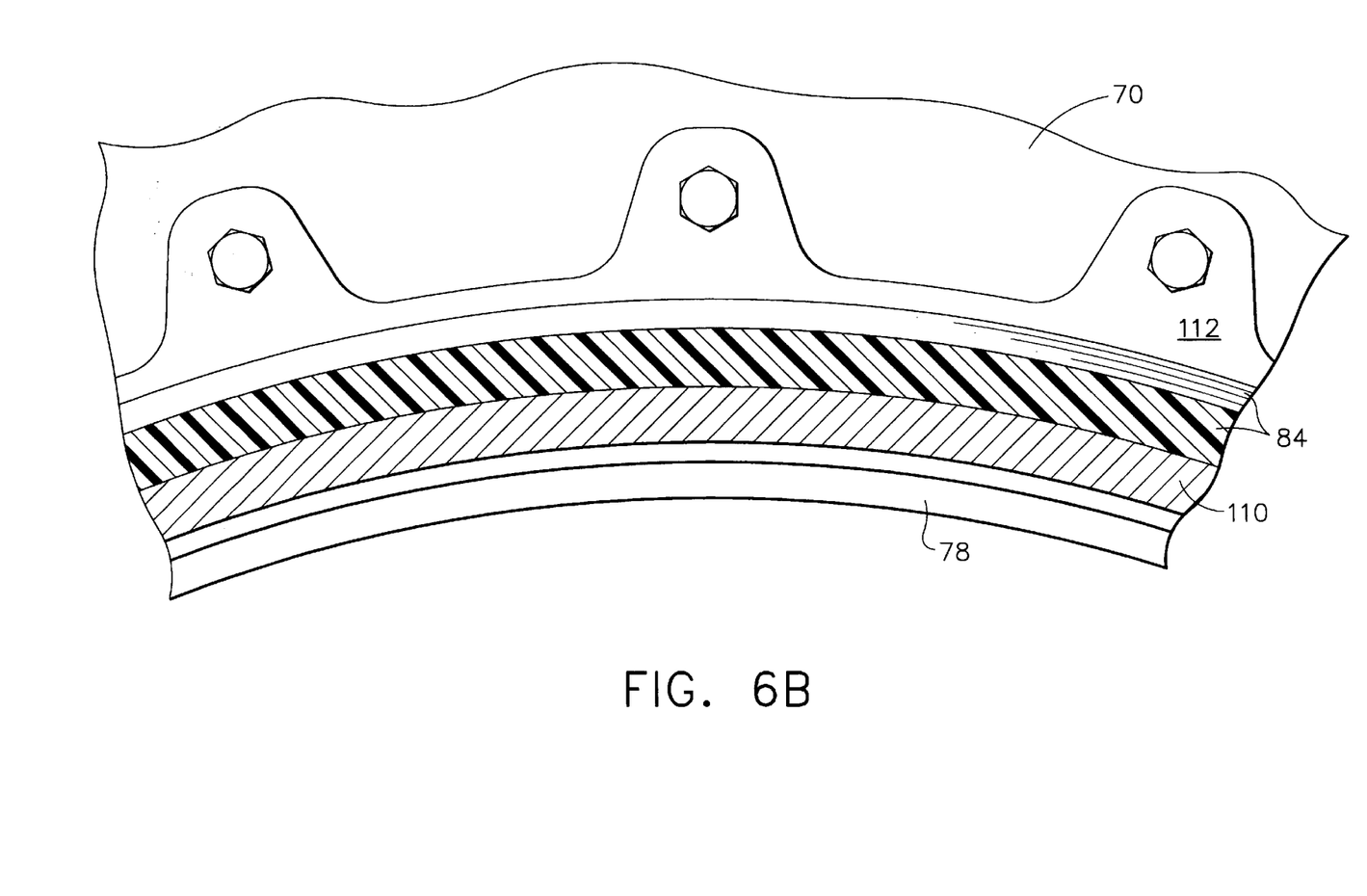

FIGS. 5 and 6 show alternatives where the composite reinforcement is applied or mounted upon a mating shaft 110 rather than onto flanges of the disk. FIG. 5 shows a shaft 110 configured to accept a spool 90 with a composite ring 84. The spool 90 is press fit onto the shafting 110 where the shaft interconnects to the disk 70 with a conventional curvics 112. A cover plate 105 is shown that is trapped upon assembly of the shaft 110 to the disk 70. FIGS. 6a and 6b shows the shafting 110 having the annular dam 82 as shown in FIG. 3a. Shaft 110 connects to the disk 70 through a bolted flange 112 positioned radially outward of the shaft. In both FIGS. 5 and 6 the disks have flange portions 78 through which the centrifugally induced tensile hoop load is transmitted to the high strength fiber reinforced shafting.

Figure 7:
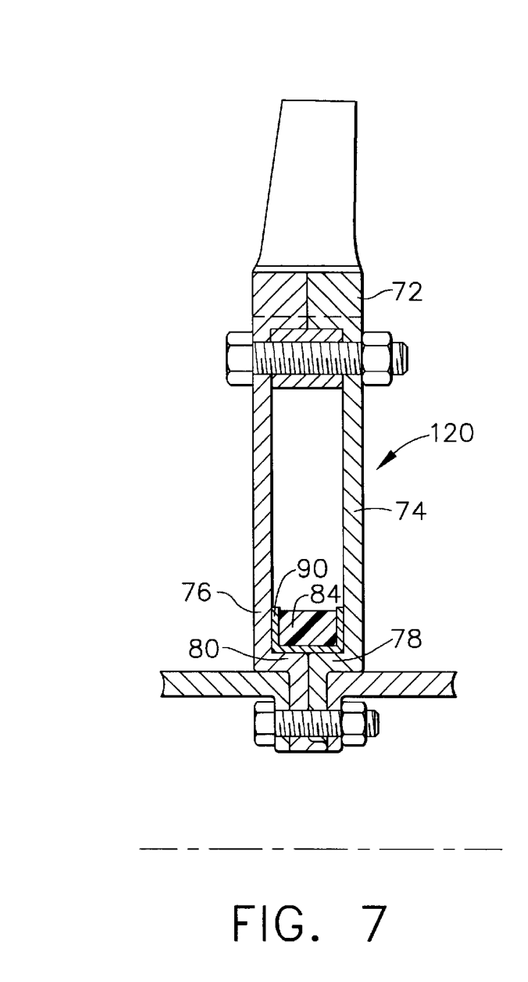
FIG. 7 is a cross-section of an embodiment of the fiber reinforced ring used on a hollow wheel.

Shown in FIG. 7 is a two piece hollow disk 120, with a composite reinforcement ring mounted inside. Like disk 70, disk 120 has a rim portion 72, an intermediate portion 74 and a hub portion 76. In this embodiment, the flanges 78 and 80 extend axially inward. A single spool 90 is then mounted on the inward facing surfaces of these flanges. The high strength composite is wrapped around the spool to form a composite ring. The disk could be bolted to the shaft as shown, or attached by conventional curvics. The two piece design obviates the need for a cover plate, and also provides a natural cavity for flowing cooling air over the composite ring if needed.

Figures 8, 9:
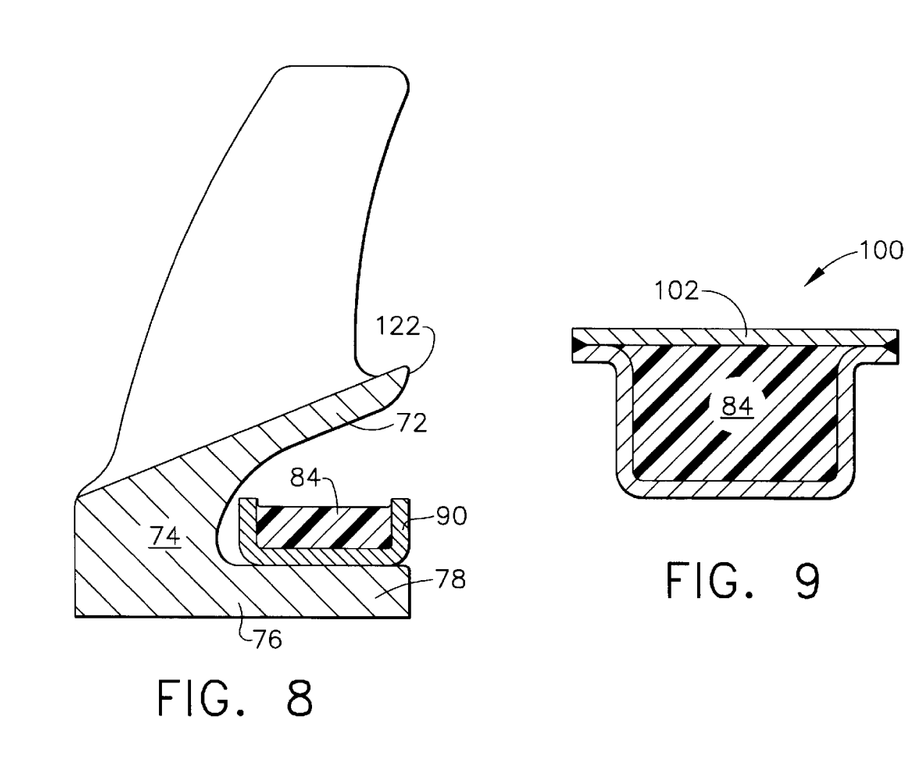
FIG. 8 is a cross-section of fan blade having a fiber reinforced ring.
FIG. 9 is a cross-section of a fiber reinforced ring encased in a metal tube.

FIG. 8 shows yet another embodiment where the disk is a fan rotor 122. Again the disk has a rim portion 72 with an array of fan blades extending therefrom, an intermediate portion 74 and a hub portion 76 that has a single flange 78. The spool 90 and composite 84 are then mounted onto this flange.

In the fan section and in portions of the compressor section of a gas turbine engine, conventional organic or epoxy matrix composites may be effectively utilized. In the higher compression stages of the compressor, and in the turbine section of gas turbine engines, operating temperatures exceed the capabilities of these composites. Material suitable for these hotter engine sections include carbon fiber—carbon matrix composite, and ceramic (SiC) fiber—ceramic (SiC) matrix composite.

Graphite (Carbon) fibers are preferable to SiC fibers because of their exceedingly high tensile strengths, some as high as 600,000 pounds per square inch. However the carbon—carbon composite must be protected from contact with oxygen when operating at turbine type temperatures. One method of protecting the composite is to employ the cover plates previously described and/or to provide active cooling. Alternatively, as shown in FIG. 9, the composite ring 84 can be encased in a hollow metal tube 100. The tube 100 seals the composite ring, preventing oxygen from reaching the graphite fibers upon formation of cracks in the ceramic matrix. The structure may be fabricated by laying up the composite within an inner portion of the tube 100 and then seam welding a top 102 in place preferably before the matrix has been cured. The tube can than be mounted to the disk as shown in FIGS. 1 through 8.

These high strength fibers have a much greater tensile strength to weight ratio than the high strength titanium or nickel based alloys typically used for gas turbine engine wheels if the majority of the fibers are essentially straight and loaded longitudinally in tension. Therefore, the maximum strength to weight ratio is achieved by maximizing the percentage of fibers that are aligned with the direction of the predominant loading being applied. In order for the fibers to most efficiently take on the hoop loading in a disk hub, the orientation of the fibers should likewise predominately be in the hoop direction. This orientation can be achieved by forming a layup of spiral wrapped fibers, or by utilizing a commercially available weaved fabric where the fibers are unbent in one direction of the weave.

High strength fibers such as carbon or graphite fibers also thermally grow much less than metals in response to an increase in temperature. The coefficient of thermal expansion of the fibers is approximately half that of metals typically used in turbine and compressor wheels. Thus for identical annular components, one made of such a composite material and one made of metal, the composite component will expand radially less than the metal component. Where an annular component made of carbon or graphite composite closely surrounds a metal component and is subjected to a temperature rise such as occurs in an engine, the metal component will grow into the composite, creating a radial interference therebetween. This radial interference tends to compress the metal component, and to expand the surrounding composite component. More importantly, the radial compression applied to the metal component tends to generate compressive hoop stress, or to reduce any preexisting tensile hoop stress. This compressive stress, or reduction in tensile hoop stress in the metal is reflected by an increase in tensile hoop stress in the surrounding composite. Thus an interference is created between the composite ring surrounding the axially extending flanges, thereby driving additional hoop loading and hoop stress into the composite ring, and reducing the hoop loading and hoop stress carried by the metal. By incorporating a sufficient volume of the composite fiber wrap, the hoop stress in the metal flanges and disk is reduced to an acceptable level.

The subject invention takes advantage of the above described features of high strength graphite or composite or similar fibers, by replacing a substantial portion of the disk mass required in a conventional disk with a ring of such fibers positioned concentric to and closely surrounding a portion of the remaining disk. As applied to a conventional turbine or compressor wheel, a metal disk may be configured to have axially extending flange portions on either side of an axially narrow bore region of the disk. These axially extending flanges have external circumferential surfaces which may be machined accurately enough for accepting a concentrically fitting composite reinforcement ring.

A ring of the high strength fibers is then either wrapped directly onto the circumferential surfaces, or separately formed and mounted thereon in a close fitting relationship. Various matrix materials may be used such as conventional organic materials, or carbon in high temperature applications. Where the ring of fibers is separately formed, it may be a composite ring alone, or a composite ring formed on a separate, spool-like metal ring. The latter version has the advantage that the metal is more readily machinable for mounting to the disk hub than a pure composite ring. Further, the separate metal ring may beneficially comprise a portion of the engine shafting, used also for rotatably supporting the wheel and for interconnecting the wheel with adjacent wheels.

During engine operation, the bore portion of the metal disk will tend to radially expand due to centrifugal loading, and also due to the accompanying temperature rise. The composite ring will also tend to expand, but at a lesser rate due to its low mass density and due to its relatively low coefficient of thermal expansion. Thus an interference is created between the composite ring surrounding the axially extending flanges, thereby driving additional hoop loading and hoop stress into the composite ring, and reducing the hoop loading and hoop stress carried by the metal. By incorporating a sufficient volume of the composite fiber wrap, the hoop stress in the metal flanges and disk is reduced to an acceptable level.

Various modifications and alterations to the above-described preferred embodiment will be apparent to those skilled in the art. Accordingly, these descriptions of the invention should be considered exemplary and not as limiting the scope and spirit of the invention as set forth in the following claims.

What is claimed is:

1. A rotatable turbomachinery disk comprising:
   a rim portion,
   an intermediate portion,
   a hub portion having at least one axial extending annular flange,
   a ring of reinforced composite fibers concentric about said flange and
   an annular dam extending radially outward from said flange and axial spaced from said hub portion to define a spool-like surface for receiving said composite fiber ring.

2. The disk of claim 1 wherein said composite ring is made from an organic matrix composite.

3. The disk of claim 1 wherein said composite ring is made of an epoxy matrix composites.

4. The disk of claim 1 wherein said composite ring is made of a carbon fiber—carbon matrix composite.

5. The disk of claim 1 wherein said composite ring is made of a ceramic fiber—ceramic matrix composite.

6. A rotatable turbomachinery disk comprising:
   a rim portion,
   an intermediate portion,
   a hub portion having at least one axial extending annular flange,
   a ring of reinforced composite fibers concentric about said flange and
   an annular dam extending radially outward from said flange and axial spaced from said hub portion to define an annular surface for receiving an annular spool.

7. The disk of claim 6 wherein said annular spool has two radially extending lips axially spaced apart to define a surface for receiving said composite fiber ring.

8. The disk of claim 7 further comprising a spacer between said annular spool and said annular dam.

9. The disk of claim 7 further comprising an interference fit between the said spool and said flange.

10. A rotatable turbomachinery disk comprising:
    a rim portion,
    an intermediate portion,
    a hub portion having at least one axial extending annular flange,
    a ring of reinforced composite fibers concentric about said flange and
    an annular spool mounted to said flange and having two radially extending lips axially spaced apart to define a surface for receiving said composite fiber ring.

11. The disk of claim 6 further comprising a cover plate mounted to said disk and to an adjoining shaft, said cover plate shaped to cover said flange, said annular spool and said composite ring.

12. A rotatable turbomachinery disk comprising:
    a rim portion,
    an intermediate portion,
    a hub portion having at least one axial extending annular flange,
    a ring of reinforced composite fibers concentric about said flange and
    a shaft adjacent said disk and having an axial extending surface in concentric contact with said flange of said hub portion, said axial extending surface having an annular spool mounted thereto, said spool having two radially extending lips axially spaced apart to define a surface for receiving said composite fiber ring.

13. The disk of claim 12 further comprising a cover plate mounted to said disk and to said shaft, said cover plate shaped to cover said annular spool and said composite ring.

14. A rotatable turbomachinery disk comprising:
    a rim portion,
    an intermediate portion,
    a hub portion having at least one axial extending annular flange,
    a ring of reinforced composite fibers concentric about said flange and
    a shaft adjacent said disk and having an axial extending surface on concentric contact with said flange, said shaft further having a radial extending flange axially spaced apart from a radially extending dam to define a surface for receiving said composite ring.

15. A rotatable turbomachinery disk comprising:

a rim portion, an intermediate portion, a hub portion having at least one axial extending annular flange, a ring of reinforced composite fibers concentric about said flange and said disk further comprising two parts bolted together to define a hollow interior and said flange has an axial extending surface facing said interior for receiving said composite ring.

16. The disk of claim 15 further comprising an annular spool disposed between said composite ring and said axial extending surface.

17. A rotatable turbomachinery disk comprising:

a rim portion, an intermediate portion, a hub portion having at least one axial extending annular flange, a ring of reinforced composite fibers concentric about said flange and encased in a metal ring.

\* \* \* \* \*